United States Patent
Bennai et al.

(10) Patent No.: US 8,320,413 B2
(45) Date of Patent: Nov. 27, 2012

(54) COMMUNICATION METHOD USING ONE ACCESS

(75) Inventors: Lahcen Bennai, Argenteuil (FR); Christian Laroque, Allemagne (DE)

(73) Assignee: Alcatel Lucent, Paris (FR)

( * ) Notice: Subject to any disclaimer, the term of this patent is extended or adjusted under 35 U.S.C. 154(b) by 936 days.

(21) Appl. No.: 09/736,298

(22) Filed: Dec. 15, 2000
(Under 37 CFR 1.47)

(65) Prior Publication Data
US 2004/0136516 A1   Jul. 15, 2004

(51) Int. Cl.
*H04J 3/12*   (2006.01)
(52) U.S. Cl. .................................................. 370/524
(58) Field of Classification Search .............. 370/522, 370/524, 227, 228; 379/220
See application file for complete search history.

(56) References Cited

U.S. PATENT DOCUMENTS

| | | | |
|---|---|---|---|
| 4,730,313 A * | 3/1988 | Stephenson et al. .......... | 714/708 |
| 4,821,264 A * | 4/1989 | Kim .............................. | 370/434 |
| 4,924,500 A | 5/1990 | Lewis et al. | |
| 5,212,691 A | 5/1993 | Hokari | |
| 5,416,779 A * | 5/1995 | Barnes et al. ................. | 370/280 |
| 5,684,806 A * | 11/1997 | Akiyama ...................... | 370/522 |
| 5,978,380 A * | 11/1999 | Kobayashi et al. ........... | 370/410 |
| 6,222,837 B1 * | 4/2001 | Ahuja et al. .................. | 370/352 |
| 6,345,091 B1 * | 2/2002 | Vernooij et al. .............. | 379/225 |
| 6,473,437 B2 * | 10/2002 | Stumer ......................... | 370/462 |
| 6,618,400 B1 * | 9/2003 | Okamura ...................... | 370/524 |
| 6,683,880 B2 * | 1/2004 | Kato ............................. | 370/399 |
| RE38,472 E * | 3/2004 | Wada et al. ................... | 370/524 |

FOREIGN PATENT DOCUMENTS

| | | |
|---|---|---|
| EP | 0 171 596 A2 | 2/1986 |
| EP | 0 391 792 A1 | 10/1990 |
| EP | 0 667 723 A2 | 8/1995 |

* cited by examiner

*Primary Examiner* — Kevin C Harper
*Assistant Examiner* — Rhonda Murphy
(74) *Attorney, Agent, or Firm* — Sughrue Mion, PLLC

(57) ABSTRACT

A telephone access (3) includes a signaling channel (5). A substitute channel (9) or substitute channels (8) can be added to the signaling channel and used when the signaling channel is down. It is shown that this makes the telephone access more suitable for a separate signaling channel access or hybrid access configuration.

9 Claims, 2 Drawing Sheets

COMMUNICATION METHOD USING ONE ACCESS

BACKGROUND OF THE INVENTION

The present invention relates to the telephony art and to a method of communication using one access, in particular one integrated services digital network (ISDN) access. The invention aims more particularly to improve the organization of the access used for communication between exchanges, in particular private automatic branch exchanges (PABX). An object of the invention is to improve access operating conditions.

The ISDN standard covers various kinds of access, as is well known in the telephony art. For example, a primary rate access, referred to as a T2 access in the ISDN standard, can convey digital data at a bit rate of 2 Mbit/s. The bit rate can be organized by dividing it into 32 telephone paths, each of which can be routed at 64 kbit/s, for example. A T2 access normally provides thirty data paths, one signaling path and one maintenance path. The remainder of this description uses the terms path and channel. A path is a physical and functional medium that connects two parties. A channel is the physical use of the whole or part of one or more paths to convey messages on a telephone link between two or more parties.

Signaling is the information needed by a public network operator or by private exchanges to switch various transmission paths progressively set up along a transmission route to enable one party to be connected to another party. For example, a call set up message sent at call set up time constitutes signaling. The set up message naturally includes the address (in practice the telephone number) of the called party and, nowadays, increasing volumes of additional information, for example the caller's name and/or telephone number and service information. The service information is essentially characteristic information which relates to the nature of the telephone used to initiate the call and is used to give the calling telephone rights over the remote telephone once they are connected, for example the right to access voicemail, automatic entry of a password, etc.

A prior art access distributes the various paths on a common physical medium. In the case of the T2 access, for example, a bundle of identical resources is devoted to an access. On a very high bit rate (140 Mbit/s) channel, the access is an allocated frequency band and/or an identified time slot capable of conveying the 2 Mbit/s bit rate made available. On a physical medium, an adequate number of telephone pairs is used to route the information. With this kind of access, there is no communication if the physical medium is down: no data, no signaling messages, no maintenance messages.

With ongoing improvements in telecommunications, it has become necessary for the various channels used (B channels for voice and data or D channels for signaling and data) to be implemented on different physical media. For example, some of these media can be analog lines and others can conform to the Internet Protocol (IP) format or the X.25 format. Note in this case the independence of the telephone paths or channels. An access of this kind is referred to as a separate signaling access or hybrid access.

However, the problem presented by the signaling path is that no further calls can be set up should it fail. Nevertheless, the precise aim of diversifying the media is to avoid massive blocking of a connection between two exchanges. The result is therefore the opposite of what is required: the access is made less resistant to breakdowns, whereas the aim was precisely to make it more reliable.

SUMMARY OF THE INVENTION

The invention solves this problem by constituting back-up signaling channels and a hierarchy of use of said back-up signaling channels, i.e. a system of relative priorities. This being the case, if a signaling channel is no longer functional, another channel is substituted for it, possibly employing a different technology, possibly attracting different management costs, possibly having a different capability and nominal bit rate, but above all offering the benefit that it can be substituted for the deficient signaling channel. It is then always possible to optimize the use of the available data paths.

The invention therefore provides a communication method using an access including at least one B channel for transmitting voice and first data and one D channel for transmitting signaling signals and second data relating to at least one of the access and the data to be transmitted, characterized in that:
  at least one additional signaling channel is constituted,
  an order of priority of the use of the signaling channels is determined, and
  the highest priority functional signaling channel is assigned to the access.

Another problem encountered with exchanges, in particular public exchanges, is that of the nominal bit rate between exchanges. It is often the case that the bit rate of the information to be exchanged necessitates the reservation of more than one standardized access (two or even three or more 2 Mbit/s accesses, for example). Access management then becomes critical should the necessary bit rate or the necessary number of paths slightly exceed the bit rate or the number of paths specified for the access. In this case, it is necessary to reserve (and pay for the use of) an additional access that will be significantly underused.

The invention solves this problem by sharing a signaling path of an access between two, three or more signaling channels. This is possible because there is not much signaling information. An additional communication path is therefore recovered at each other access. It can be shown that with two accesses the improvement is $1/60$, with three accesses it becomes $2/90$, and so on.

The invention therefore also provides a communication method in which:
  at least two accesses are used between two exchanges each having at least one B channel for transmitting voice and data,
  which method is characterized in that:
  a common D channel is constituted for transmitting signaling signals relating to at least one of the accesses and the data to be transmitted,
  signaling signals relating to at least two accesses are shared on said channel, and
  the two accesses are managed using the signaling signals delivered by said common signaling channel.

Of course, the additional signaling path is preferably a common signaling channel sharing a signaling path with a signaling channel of another access.

BRIEF DESCRIPTION OF THE DRAWINGS

The invention will be better understood after reading the following description and examining the accompanying drawings. The drawings are given entirely by way of non-limiting and illustrative example of the invention. In the figures.

DETAILED DESCRIPTION OF THE INVENTION

Figure 1:
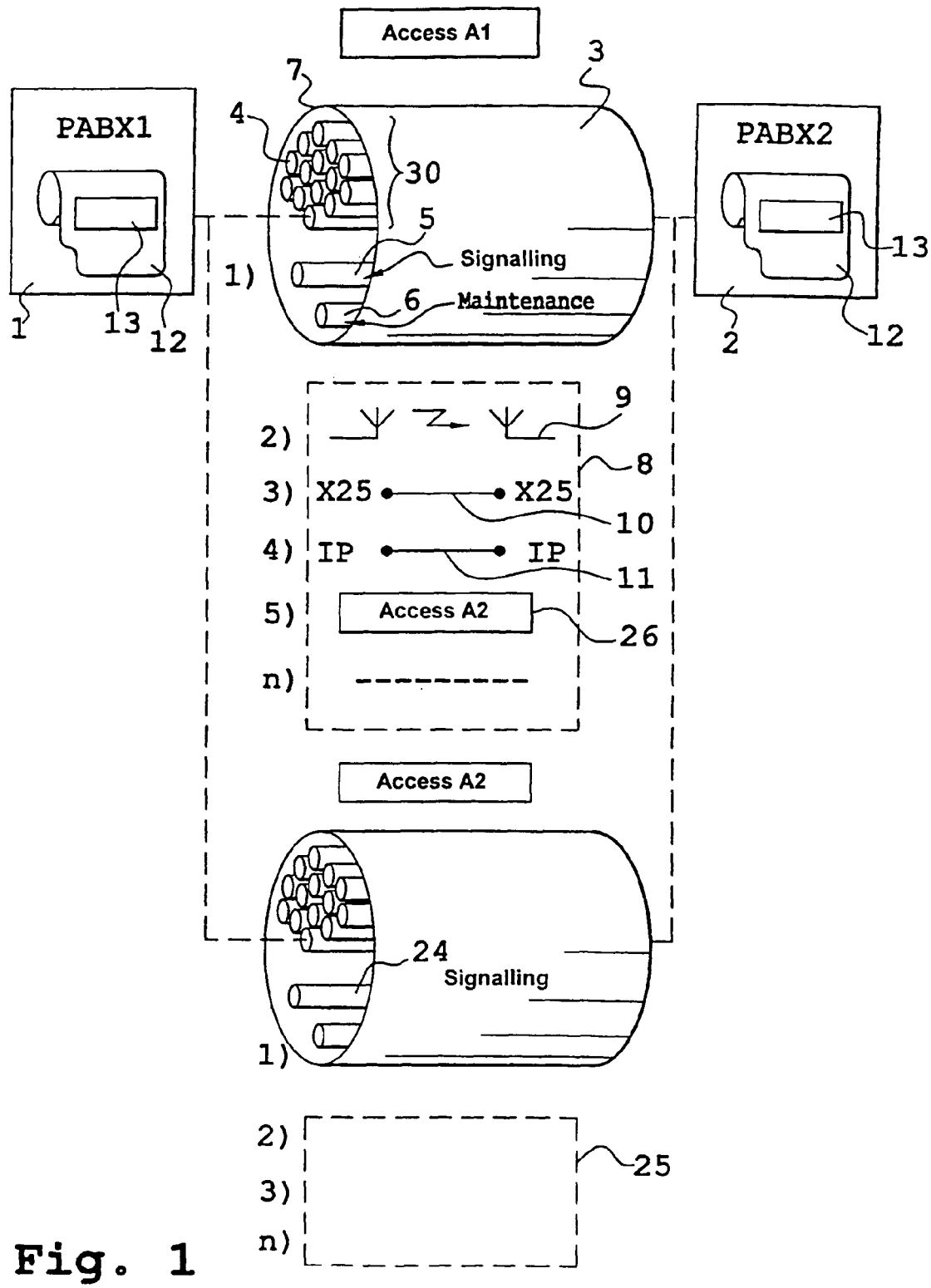
FIG. 1 is a diagram showing the resources employed in a communication method according to the invention.

FIG. 1 shows a set of resources that can be used to implement the method according to the invention. It shows an exchange 1 (PABX1) connected to another exchange 2 (PABX2) by a base rate access 3. The base rate access 3 includes at least one path 4 for transmitting data. If the access 3, also referred to as the Access A1, is a T2 access in accordance with the ISDN standard, even under normal circumstances it includes thirty data channels such as the channel 4. The access 3 also includes a signaling path 5 and a maintenance path 6. The paths 4, 5 and 6 usually each include a transmission channel with a nominal bit rate of 64 kbit/s. In one example, the channels 4, 5 and 6 take the form of a reserved frequency or time slot on a very high bit rate channel. The exchange interfaces needed for this reservation are included in the access 3. They do not form part of the invention.

The representation of the access 3 in the form of a tube 7 suggests that the technology of the channels 4, 5 and 6 is the same. This was the case in the prior art. However, it is not necessary for the technology to be the same. In a system of the invention, the channels 4 could have a different technology to the channels 5 and 6. Similarly, the channels 4 themselves could use different protocols or technologies.

The problem that the invention addresses is that of failure of the signaling channel 5. In accordance with the invention, at least one additional signaling channel is constituted if the signaling channel 5 fails. In practice, a set 8 of additional signaling channels could be constituted.

For example, the set 8 could include a radio channel 9, a channel 10 routed in accordance with the X.25 standard, a channel 11 conforming to the Internet protocol, and other channels referred to later. The channels 9, 10 and 11 are represented symbolically. In practice, the exchanges 1 and 2 are connected to equipment units enabling use of the channels 9, 10 and 11. The management circuits of the exchanges 1 and 2 include programs 12 which include in particular subroutines 13 relating to managing or routing signaling messages.

An object of the invention is to modify the subroutines 13 in such a way as to remedy failure of the signaling channel 5.

The subroutine 13 establishes a hierarchy within the set 8 of additional signaling channels. Relative priorities are determined. The higher the priority of the signaling channel 5, the greater the provision in the subroutine 13 for the channel 9 to be substituted for it if the channel 1 is down. Alternatively, the channel 10 must be substituted for the channel 9 if the channel 9 is down and the channel 5 is also down at the same time. Likewise, for the channel 11, the previous three channels must be down.

Figure 2:
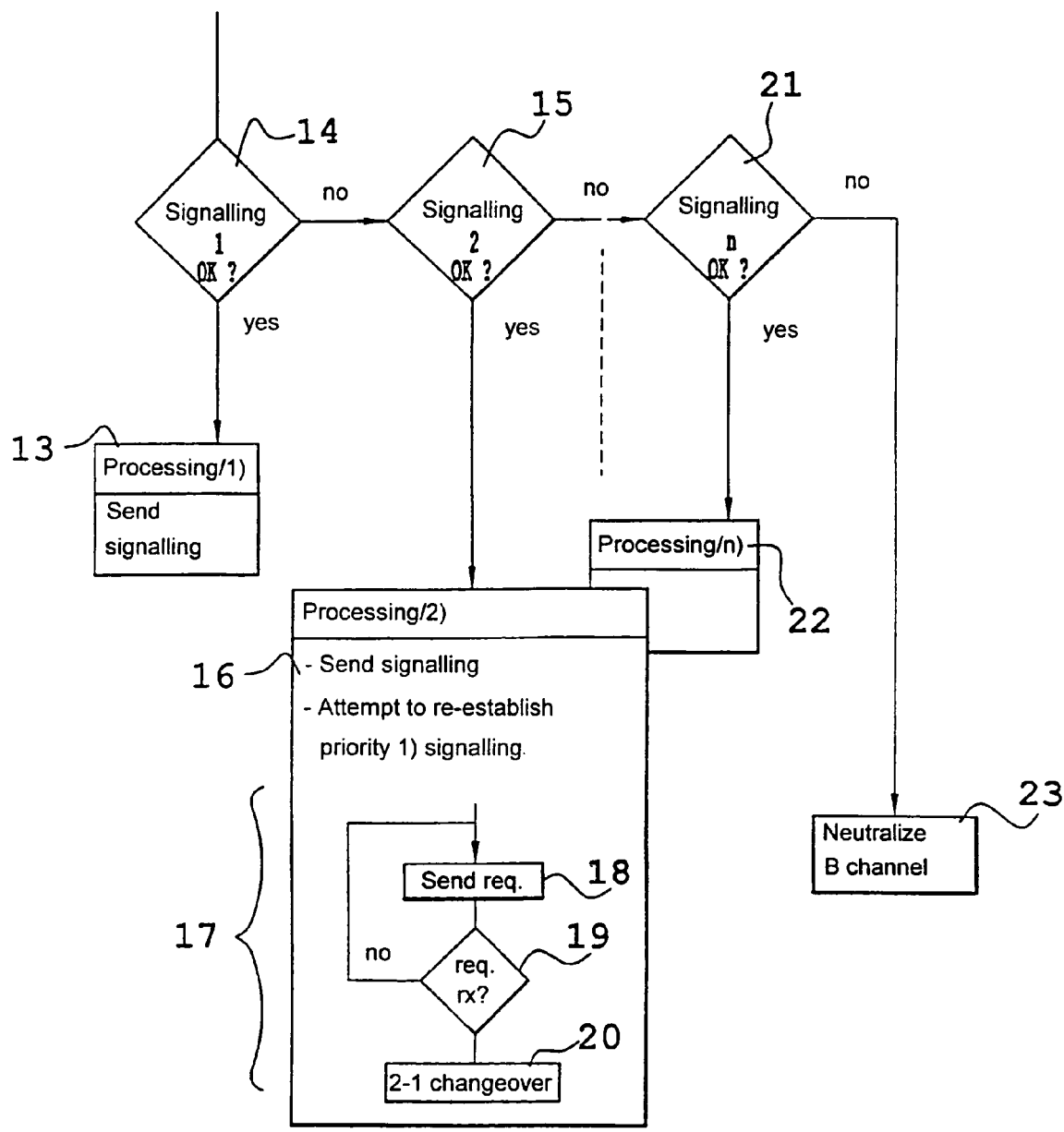
FIG. 2 shows the operations involved in an improved method according to the invention.

FIG. 2 shows diagrammatically the modified content of the subroutine 13, which includes a set of additional functions over and above the usual functions. The additional functions include a test 14 which is used before routing a new call or modifying an existing call (modifying the transfer rate, putting the call on hold), for example. The test 14 verifies that the signaling channel 5, having priority level 1, is functional. If it is functional, the test 14 causes the signaling channel 5 to execute the remainder of the subroutine 13, simply sending it the signaling signals corresponding to the call to be set up or modified. This type of operation is known in the art. Only the test 14 has been added.

If the signaling channel 5 is not functional, a test 15 determines if the channel 9, having priority level 2, is functional. If it is functional, it executes the remainder of the subroutine 13, i.e. sending the signaling relating to the call to be set up or modified (16), as before. However, in accordance with the invention, because it is a replacement signaling channel, the aim is to have the channel 9 test for signaling on the channel having priority level 1, i.e. the signaling channel 5. For example, during a series 17 of steps, following the sending step 16, in a step 18 the subroutine 13 sends a call request on the channel 9 to open the channel 5. During a consecutive test step 19, the subroutine 13 verifies that the call request was received and that the channel 5 has been opened (re-established).

If not, the step 18 of sending the call request is repeated. The period after which it is repeated can be modified on demand, of course. The repeat can include a time-out.

On the other hand, if the call request to open the channel 5 is received, the series 17 of steps terminates with a step 20 which changes from of the signaling channel having the priority level 2 to the signaling channel having the higher priority level 1.

Various subsequent tests 21 are applied until a last signaling channel of priority level n is used. If the signaling channel of priority level n is the only valid channel, operations 22 of the same type as the operations 16 to 20 are executed in the subroutine 13. However, the re-establishment tests conducted by the signaling channel having priority level n are effected to the benefit of the signaling channel having priority level n−1. In this case, there is only a gradual return to the channel having priority level 1. This occurs only if all the signaling channels provided are functional. To avoid this process, which can be laborious, the tests effected by the program 22 can not only target the channel having priority level n−1 but also give preference to targeting the channel having priority level 1, and so on up to the channel having priority level n−1 itself.

The tests on the status of the signaling channels are not necessarily carried out for each new call, or each time that signaling messages are to be transmitted. A signaling automaton preferably manages the signaling channels and indicates which signaling channel must be used at a time t. The various tests depicted in FIG. 2 are preferably executed only if the status of a signaling channel changes. Similarly, the test for re-establishing the higher priority level signaling channels is not effected all the time, but only at the request of the signaling automaton. The automaton uses time-outs for this.

It may appear that the bit rate of a standby signaling channel is insufficient for routing all of the signaling calls relating to Access A1. In this case, degraded operation of Access A1 can be authorized, rather than registering this as a failure and declaring the whole of the access as down. Degraded operation is obtained by neutralizing one or more of the B channels managed by the signaling channel. In other words, if the only signaling channel still functional (channel n) is incapable of managing all signaling signal transmissions, some of the B channels are neutralized by an operation 23 and cannot be used to set up new calls or to modify a call that has already been set up.

FIG. 1 shows another access, Access A2, between the exchange 1 and the exchange 2. Access A2 is constructed in the same fashion as Access A1 with B channels and in particular a signaling channel 24 specific to that access. In the invention, Access A2 can also be provided with a series 25 of back-up signaling channels that can be used if channel 24 is down.

FIG. 1 also shows that the series 8 of back-up signaling channels for the access 3 in fact includes a designation 26 of a channel referred to as Access A2 having priority level 5

(although it could have a different priority, of course). Thus the signaling channel 24 is used to overcome the deficiency of the signaling channel 5. In this case, the signaling channel 24 carries the signaling relating to the thirty B paths of Access A1 and the signaling relating to the thirty B paths of Access A2. In this case there are two signaling channels on the path 24. Any system can be used to divide this path between two channels. A different temporal distribution can be envisaged. A frequency distribution can also be envisaged, especially if channel 24 is of a radio channel, like channel 9.

Outside the context of channel 5 being down, referred to above, this approach has the benefit of making an additional transmission path available to the exchanges 1 and 2, namely the path 5, which is normally used as a signaling channel for Access A1. To free up an additional path in this way it is sufficient to declare the channel 5 as usable in the subroutine 13 as a B channel for voice and not for transmitting signaling signals. In this case, the channel 24 can be used as a systematic substitute channel. As the signaling channels are generally oversized, the channel 24 can transmit signaling signals relating to the B channels of Access A1 and Access A2. The channel 5 can then simply be used as an additional B channel: this increases the usable access bit rate made available to the two exchanges by approximately $1/60$. Of course, this process is reproducible through pooling signaling channels specific to three or more accesses on the same signaling path.

With the solution of the invention, because of the separation of the physical media that can be used to convey data on the various channels made available, the signaling channel concept loses its dedicated character, in favor of a more functional concept. Thus it would even be feasible to use one of the four B channels of Access 1 as a signaling channel replacing the signaling channel 5 of the same access. In the future Access A1 and Access A2 will be "hybrid" in the sense that the various channels will no longer be supported by the same physical media.

The changeover procedure 20 could imply that the exchanges 1 and 2 establish the signaling link automatically and spontaneously on a back-up channel as soon as a higher priority channel is no longer functional. This could entail human intervention if necessary.

Until now the signaling channels have been substituted for each other hierarchically. It is nevertheless feasible to replace a signaling channel 5 that is down with a substitute channel 9 and a channel 10 to top up the usable bit rate of the channel 9 if it is insufficient. This approach is an alternative to the operation 23, which merely neutralizes one of the B channels of the access.

In the invention, it is therefore possible to have several signaling channels of equal priority set up at the same time. Accordingly, if a signaling channel is cut off, there is an automatic changeover from one channel to another, without any loss of signaling. It is equally possible, in order to limit costs, not to have several signaling channels set up at the same time. If a signaling channel is cut off there is an automatic changeover from one channel to another, possibly with loss of signaling during the time needed to set up the channel. However, calls already set up on the B channels are not cut off. It is equally possible to use signaling channels according to their cost. The priority concept previously referred to minimizes the overall cost of a hybrid access of this kind.

If the same signaling channel is used for Access A1 and Access A2, flow control is effected on the signaling channel in order to limit the number of channels dynamically, if necessary. Flow control, possibly terminating in neutralization (operation 23), is particularly justified if there is only one signaling channel 24 managing the communication channels of Access A1 and Access A2. If the signaling channel is congested, the subroutine 13 controlling the signaling channel limits the number of paths dynamically: paths not yet used are temporarily taken out of service and presenting new calls are refused. When the signaling channel is no longer congested, the paths taken out of service are returned to service dynamically.

The invention claimed is:

1. A communication method using a first access providing a plurality of information channels including one information channel for transmitting voice and first data and having at least one signaling channel for transmitting signaling signals and second data relating to at least one of said access and said first data, said method further comprising the step of providing at least one additional signaling channel in a signaling path of a second access which also provides a plurality of information channels, said additional signaling channel being on a different physical medium from said first signaling channel and for use in conjunction with said one information channel, determining an order of priority of the use of the signaling channels, and assigning the highest priority functional signaling channel to the first access, wherein said step of providing at least one additional signaling channel comprises the step of forming said additional signaling channel from a channel which can be used as an information channel of said second access.

2. A method according to claim 1, characterized in that the information channel for transmitting voice and first data is on a different physical medium from at least one of the signaling channels.

3. A method according to claim 1, characterized in that the operational status of the highest priority signaling channel is regularly tested when said highest priority signaling channel is not in service.

4. A method according to claim 1, characterized in that each said access provides thirty information channels.

5. A method according to claim 1, wherein said first and second accesses are each ISDN accesses having B channels for information and a D channel for signaling, and wherein a B channel of said second access is converted to said additional signaling channel.

6. A communication method using a first access including a plurality of information channels for transmitting voice and first data and one signaling channel for transmitting signaling signals and second data relating to at least one of said access and said first data, said method further comprising the step of providing at least one additional signaling channel for use in conjunction with at least one of said information channels, determining an order of priority of the use of the signaling channels, and assigning the highest priority functional signaling channel to the access, said method further comprising the step of inhibiting functionality of a subset of said information channels if the signaling channel in service is congested.

7. A method according to claim 6, wherein said step of inhibiting functionality comprises rendering said subset of said information channels unavailable for use in setting up calls.

8. A method according to claim 6, wherein said step of inhibiting functionality comprises rendering said subset of said information channels unavailable for use in modifying calls that have already been set up.

9. A method according to claim 6, wherein said congested signaling channel is incapable of managing all signaling signal transmissions for all information channels of said first access.

* * * * *